United States Patent [19]

Gopinath

[11] Patent Number: 5,990,885
[45] Date of Patent: Nov. 23, 1999

[54] PERSONALIZED SERVICES, INCLUDING A PERSONAL PRESENCE, FOR CUSTOMERS BASED UPON COLLECTED PERSONAL PREFERENCES

[75] Inventor: Bhaskarpillai Gopinath, Watchung, N.J.

[73] Assignee: Network Machines, Inc., Piscataway, N.J.

[21] Appl. No.: 08/902,003

[22] Filed: Jul. 29, 1997

[51] Int. Cl.[6] .................................................. H04N 7/173
[52] U.S. Cl. ................................ 345/327; 348/1; 348/8; 455/2
[58] Field of Search .................................. 455/2, 6.2, 6.3, 455/5.1, 4.1, 4.2, 6.1; 348/1, 10, 11, 12, 13, 7, 6, 8; 709/219; 345/327

[56] References Cited

U.S. PATENT DOCUMENTS

| | | |
|---|---|---|
| 5,515,098 | 5/1996 | Carles ............................................ 348/8 |
| 5,521,631 | 5/1996 | Budow et al. ................................ 348/1 |
| 5,798,785 | 8/1998 | Hendricks et al. ........................... 348/1 |
| 5,801,747 | 9/1998 | Bedard ......................................... 348/1 |

Primary Examiner—Chris Grant
Attorney, Agent, or Firm—John T. Peoples

[57] ABSTRACT

An arrangement to provide personalized services to customers, such as hotel guests or hospital patients, wherein the personalized services are based upon a personal preference profile collected for each individual. The services are displayed to the guest or patient via an in-room monitor. Moreover, the personal preferences are modified during the guest's or patient's present stay, and saved after the stay for later visits. In addition, a personal presence of host personnel, such as personnel at a front desk or an admission desk, may be integrated into the display on the in-room monitor.

20 Claims, 7 Drawing Sheets

PERSONALIZED SERVICES, INCLUDING A PERSONAL PRESENCE, FOR CUSTOMERS BASED UPON COLLECTED PERSONAL PREFERENCES

BACKGROUND OF THE DISCLOSURE

1. Field of the Invention

This invention relates generally to distributed customer systems, and, more particularly, to methodologies and concomitant circuitry for the delivery of personalized services, including a personal presence, to individual customers.

2. Description of the Background

Traditionally, in a service setting such as a guest in a hotel/motel or a patient in a hospital, the guest or patient has been provided with basically the same standardized room-based services, that is, personalized options are virtually impossible to arrange for an individual guest or patient, especially prior to check-in. It is also true that a guest-stay or patient-stay, in terms of room-based services, is viewed as an independent event from one stay to the next. There is virtually no attempt to "remember" the preferences of the guest or patient from prior stays so as to make the next stay more personalized, and therefore more enjoyable. Nor is there any real effort to modify preferences of a guest or patient based upon choices during the present stay. Finally, there is no viable mechanism to capture the preferences of the guest or patient with respect to room-based services prior to check-in.

To understand the limitations of the traditional approach to guest or patient services, consider the following enhanced services (heretofore unavailable) in a hotel scenario. The personalized preferences of an individual guest are captured and stored, either upon reservation or based upon selections during past visits, so that after check-in, as the guest enters his hotel room, he hears his favorite music playing over a stereo in the room. Also when he turns the TV on, he sees a personal welcome message for him in Spanish, his native language. With the remote TV control, he accesses the hotel's restaurant guide. Further, he is able to call into view the maitre'd of a particular restaurant to discuss menu selections, and then reserve a table as well as make a menu selection for dinner later that evening. Then he calls into view the concierge, again on the TV, to ask some questions about the other hotel services and area attractions. The conceriege extracts an area map as stored in a database and displays the map on the guest's TV. Next, the guest picks up the phone to call his spouse to inform her he has arrived at his hotel room. The phone has been programmed for speed dialing to his home phone number, and he is so informed upon picking up the phone. At the same time, in the background, guest inquiries and selections are being utilized to adapt the prior list of personal preferences so as to store the most up-to-date information about the guest.

After dinner, the guest decides to watch a movie on his in-room TV. He browses the selections in the movie guide from a personalized list of recommendations—based upon his preference list and selections from past hotel stays, comedies are his interest so the movie guide lists comedies first. He chooses and begins watching a movie, but he stops the movie before it is finished so he may retire for the night. In the morning, the guest is awakened with his regular news broadcast on TV. The breakfast he had ordered the night before via a menu displayed on his TV arrives, and as he completes breakfast, he is able to finish watching the movie from the previous night. After the movie, a stock ticker is automatically displayed on the TV because the guest had expressed an interest in being kept informed about financial markets. Again, any choices by the guest that may impact on the list of personal preferences are used to automatically adapt his list of personal preferences. For instance, suppose that during the stock ticker display, the guest decides to watch another movie, this time a musical. The list of personal preferences might then be modified so that musicals are listed first, then comedies, for the next time the guest desires to watch a movie.

Upon check-out, the guest's list of personal preferences, as adapted during his visit, are stored in a database for use during a later hotel stay.

Other possible services not discussed in the illustrative example above, but which would be made available depending upon the guest's interest, include: (1) send and receive e-mail and faxes via an in-room connection using the guest's laptop; (2) establishing an in-room Internet connection; and (3) play interactive games with other hotel guests over the TV, with a live host at a remote hotel location joining in the action to encourage the players and add a "realness" dimension to the game.

As may now be readily appreciated from the foregoing discussion, the prior art is devoid of teachings or suggestions for collecting personal preference information about an individual—prior to check-in, upon check-in, and during the individual's stay—and adapting the personal preference information during individual's stay to update the individual's personal preference information for present as well as later use.

SUMMARY OF THE INVENTION

Shortcomings and limitations of the prior art are obviated, in accordance with the present invention, by methodologies and concomitant circuitry wherein, generally, a personal preference profile is adapted based upon user selection.

In accordance with one broad aspect of the present invention, a method for providing guests a personalized service using a room-based device responsive to inputs from and providing outputs to each particular guest, with each device being connected to a central controller, includes the steps of adapting personal preference information based upon the inputs from each particular guest, and communicating personalized responses corresponding to the personal preference information from the controller to the device of each particular guest.

In accordance with another aspect of the present invention, the broad aspect of the invention elucidated above is further combined a detector to monitor host personnel at a point-of-presence in real-time so that the personalized response is based upon both the personalized prefernce information and information provided by the host personnel.

In accordance with yet another aspect of the present invention, the broad aspect of the present invention described above is further combined with both the real-time presence of host personnel and the capability to access and display, as part of the personalized responses, video and/or audio information stored in storage devices.

In still another aspect of the present invention, a remotely located service manager may couple to the processor to manage the controller, such as by downloading programs or personal preference information collected centrally.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized to provide personalized services to customers, such as hotel guests or hospital patients, wherein the personalized services are based upon a personal preference profile collected for each individual.

Overview of the Present Invention

Figure 1:
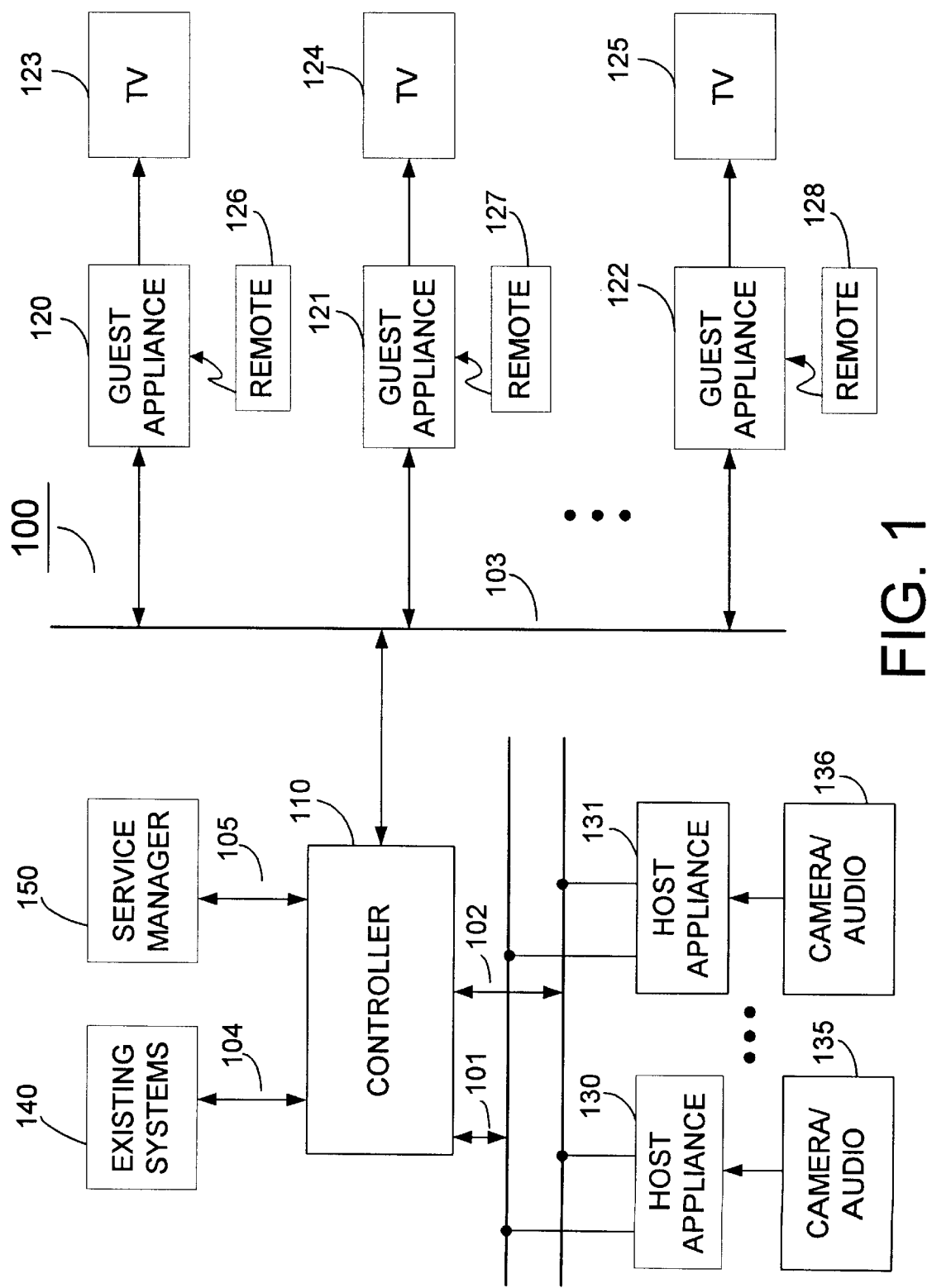
FIG. 1 is a high-level block diagram of the system for providing personalized preferences to guests.

This section describes system 100 of FIG. 1 in overview fashion so as to introduce the technological environment in which the present invention operates, as well as to introduce terminology helpful in further describing the details—both hardware components and system software—which follow in the sequel. For purposes of specificity, but not by way of limitation, system 100 is illustrated as operating in a hotel service environment wherein the hotel operator is the host that serves hotel guests. However, the generality of system 100 allows deployment in other host-customer environments, such as a hospital or school.

With reference to FIG. 1, system 100 is generally composed of: (a) controller 110; (b) one or more guest appliances 120, 121, . . . coupled to standard TV's 123, 124, . . . respectively, the guest appliances being operated with remote controllers 126, 127, . . . respectively; (c) one or more host appliances 130, 131, . . . with associated video cameras and audio pick-ups 135, 136, . . . , respectively; (d) host network bus 101 and host video link 102 interconnecting the host appliances with controller 110; and (e) guest link 103 interconnecting the guest appliances with controller 110. System 100 is arranged to be both a service creation as well as a deployment platform which interfaces with other, existing systems 140 serving a given hotel—such existing services include, for example, cable TV or broadcast TV, and telephone connections for faxes, e-mail, and accessing the Internet. The interconnection between system 100 and existing services 140 is shown generically by link 104 to platform 110.

System 100 is arranged so that enhancements to the system may be effected incrementally without the need for the total replacement of a monolithic system. This is accomplished by ensuring system 100 is expandable and customizable through add-on hardware and downloadable program updates from system manager 150, which may be remotely located from system 100 and coupled to system 100 with link 105.

Guest appliance 120, considered as being exemplary of guest appliances 120, 121, . . . , is the in-room portion of system 100. A guest views information, that is, content, on TV 123 associated with guest appliance 120 located in a particular guest's room; a guest interacts with guest appliance 120 via a remote control 126, such as an infra-red remote control having the conventional television buttons/controls as well as other buttons/controls specific to system 100.

Host appliance 130, considered as being representative of host appliances 130, 131, . . . , enables both personal and personalized host-originated services for guests. For instance, hotel appliances are located at various services points in the hotel from which electronic contact may originate with the guests, such as the front desk, concierge desk, or restaurant. Thus, host appliance 130 is typically arranged with local video camera and audio pick-up 135 at a point-of-presence of hotel personnel to send real-time, live feed to the guests in their rooms.

Figure 2:
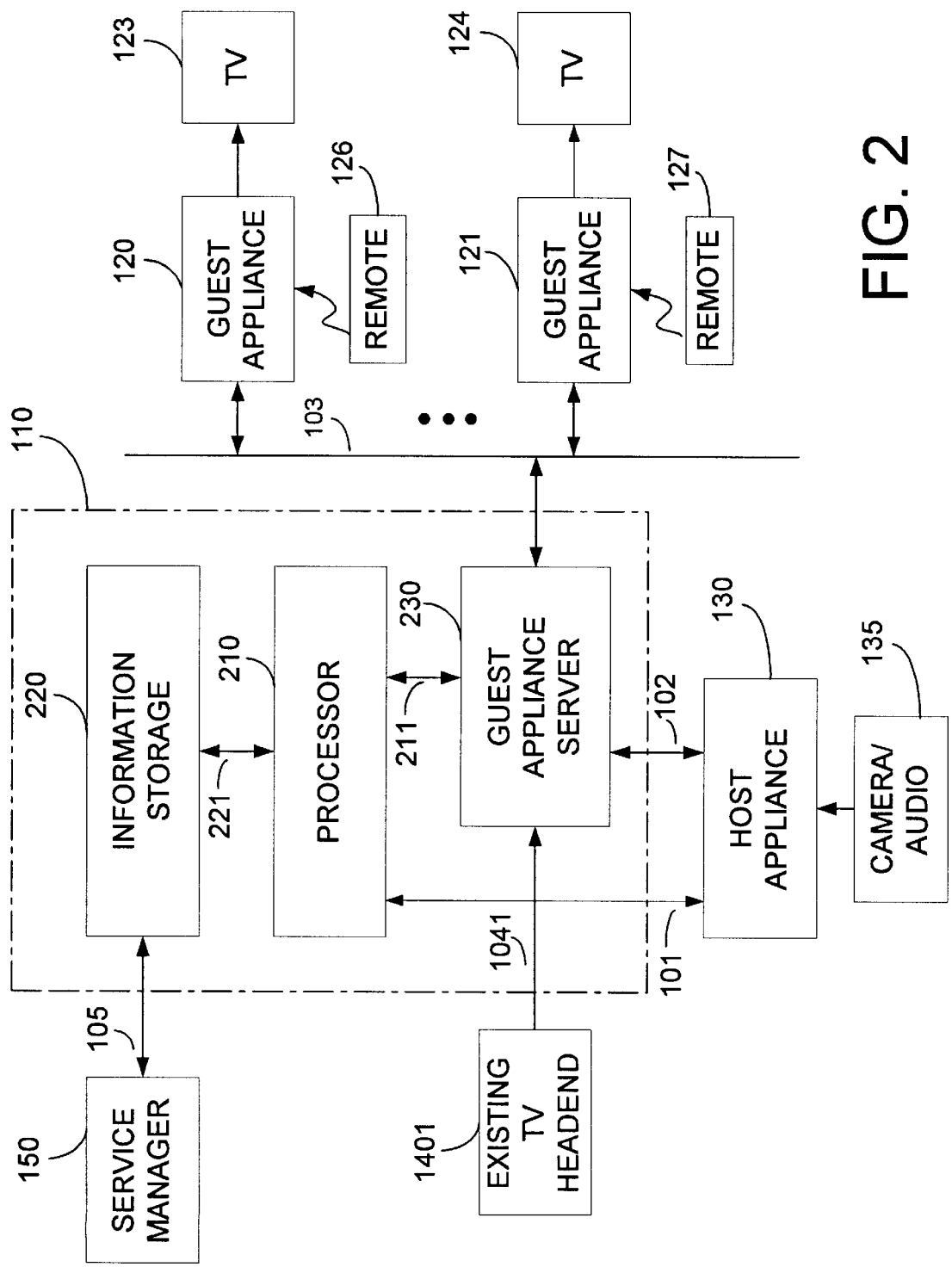
FIG. 2 depicts a high-level block diagram of the controller of FIG. 1.

Controller 110 is composed of computing, communications, and distribution control portions of system 100; these aspects will be covered in more detail with reference to FIG. 2.

Bus 101 is typically composed of a bus supporting the Ethernet protocol for data interchange, and link 102 is a standard medium such as a coaxial or fiber optic cable for propagating television signals over a plurality of channels.

Link 103 is generally a single coaxial or fiber cable for propagating both television signals as well as control information to and from each room via guest appliances 120, 121, . . . . System 100 may be specially designed to make use of the existing room cabling, that is, there is no need to rewire a hotel to deploy system 100, this avoiding a significant expense.

System Hardware

Referring now to FIG. 2, there is shown a more detailed block diagram of the components comprising controller 110. With reference to FIG. 2, controller 110 is further composed of: (a) controller processor 210; (b) information storage device 220 connected to processor 210 via bus 221; and (c) guest appliance server 230 connected to processor 210 via bus 211, as well as being interposed between links 102 and 103. Also shown are link 105 to service manager 150 and connection 1041 to an existing TV system 1401, such as broadcast or cable TV.

Information storage device 220 stores guest records, each record including, for example, the specific guest's name, address, home phone number, dietary requirements, TV channel preferences, menu preferences, music preferences, movie preferences, and so forth. The initial guest record may be directly obtained upon reservation or upon check-in, or may even be downloaded from service manager 150 which may serve as a centralized reservation agent. The records in storage device 220 are dynamically modified during the guest's visit to ensure updated guest information under control of controller processor 210.

In-room guest requests, as initiated by, for example, the guest inputting selections into the keypad of remote control 126, are transmitted from guest appliance 120 to guest appliance server 230 over link 103 and, in turn, to processor 210 via link 211. For instance, suppose the guest makes a personalized request to call into view the concierge whose location is monitored by video camera and audio pick-up 135 associated with host appliance 130. This request in transmitted uplink from guest appliance 120 over link 103 to guest appliance server 230. The uplink and downlink communications of guest transactions between guest appliances 120, 121, . . . and guest appliance server 230 take place on a selected channel from link 103; link 103 also carries a plurality of channels each having a bandwidth typical of a TV channel. Server 230 separates uplink requests from downlink transmissions propagating on link 103, and forwards the uplink request to processor 210. Processor 210 identifies the specific guest from the uplink request, determines in this example that the concierge's host appliance 130 is not being used, and then enables host appliance 130 via bus 101 so that the composite TV signal now emanating from video camera and audio pick-up 135 may be may be transmitted on link 102. Moreover, processor 210 identifies and marks an unoccupied TV channel on link 103 and signals guest appliance 230 to place the incoming signal from link 102 onto the marked channel, and furthermore signals guest appliance 120 over the downlink communications channel on link 103 to display the signal incoming on the marked channel on TV 123. Two-way voice communications with the concierge may then take place over the standard room telephone, and the visual/audio part of the concierge contact is conveyed as described above—note that the concierge may display to the guest visual material (maps, directions, and so forth) by placing such material within the view field of camera 135.

While the foregoing communication is occurring over the marked channel, other channels may simultaneously be marked by other guests for similar purposes. At the same time, however, other guests not presently invoking a personalized request may tune to standard broadcast channels transmitted over link 1041 from existing TV head-end 1401 to link 103 via interposed guest appliance server 230. This is accomplished, for example, by arranging guest appliance server 230 with the capability to pass through a set of standard broadcast channels to all rooms, so that any guest may select a conventional broadcast channel in the standard manner using the in-room remote controller.

Figure 3:
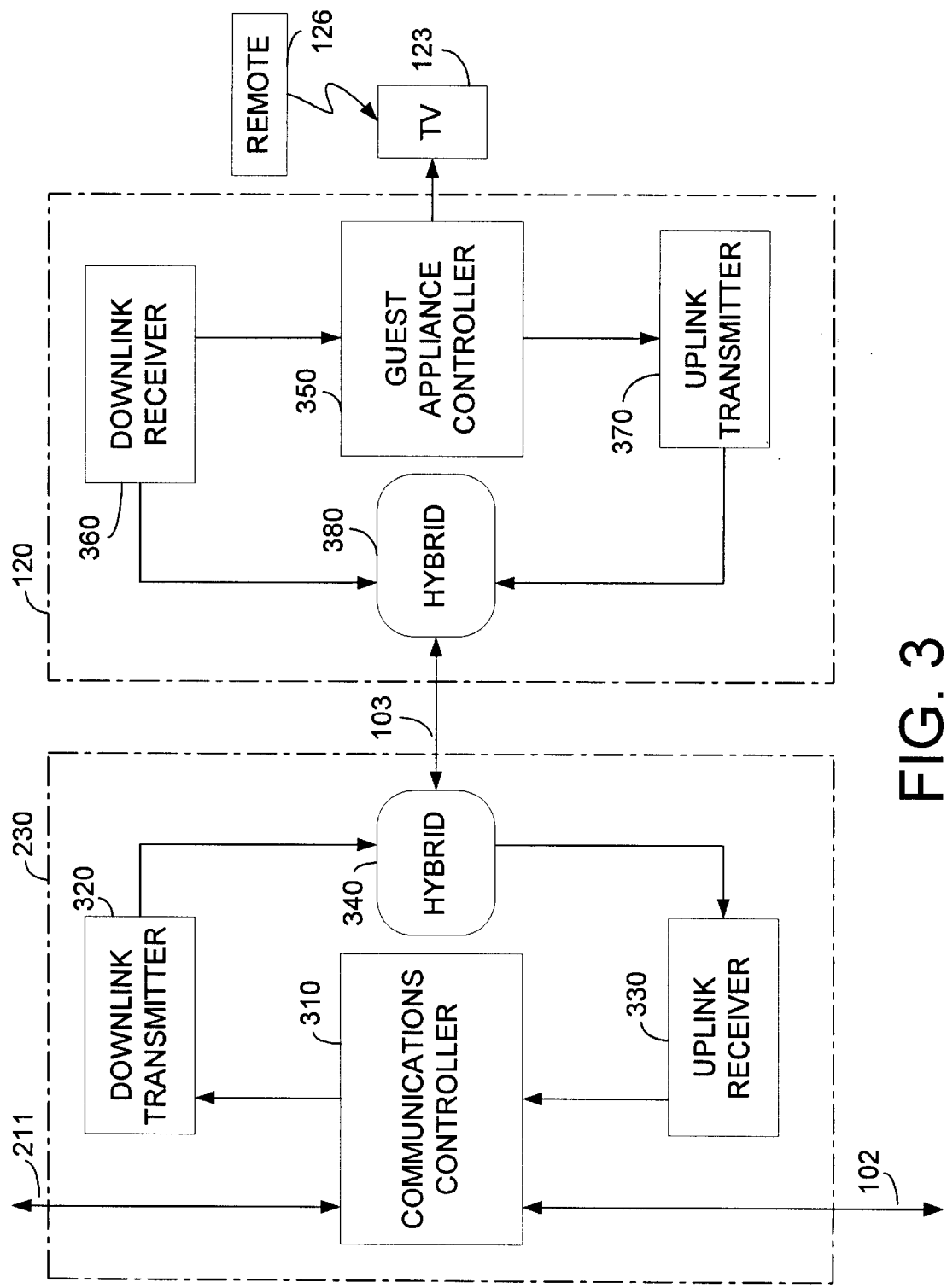
FIG. 3 depicts a high-level block diagram of the guest appliance server and guest appliances of FIG. 2.

Now with reference to FIG. 3, there is shown a high-level block diagram of the elements comprising an illustrative embodiment of guest appliance server 230 and guest appliance 120 which function in a cooperative manner to carry out the guest communications aspect of system 100. As illustrated in FIG. 3, guest appliance server 230 is composed of communication controller 310, downlink transmitter 320, uplink receiver 330, and hybrid 340. Communications controller 310 receives control and guest communication inputs over bus 211 from processor 210 (see FIG. 2) and the links exemplified by link 102 from host appliance 130 (see FIG. 2). Moreover, controller 310 receives guest requests transmitted from guest appliances 120, 121, . . . and detected via uplink receiver 330, and outputs information destined for guest appliances 120, 121, . . . as well as a plurality of TV-quality channels via downlink transmitter 320. Typically, downlink transmitter 320 performs a modulation operation to electrically place the TV channels at desired points in the frequency spectrum, that is, the guest communication channel and the plurality of TV channels propagated by link 103 utilize frequency-division multiplexing. Hybrid 340 is a standard device that separates downlink transmission from uplink reception.

Guest appliance 120 is composed of guest appliance controller 350, downlink receiver 360, uplink transmitter 370, and hybrid 380. Downlink receiver 360 is performs the complementary operations to downlink transmitter 320; similarly, uplink transmitter 370 and uplink receiver 330 are complementary pairs. Hybrid 380 is essentially identical to hybrid 340 in operation. Guest appliance controller 350 receives inputs from downlink receiver 360 and remote control 126, and outputs signals to TV 123 and uplink transmitter 370.

The technique for communicating guest requests over the guest communication channel portion of link 103 is any suitable arrangement which conveys a potentially large number of simultaneous guest requests without conflict, that is, the guest communication channel must be allocated sufficient bandwidth to avoid contention. Moreover, the technique should not interfere with the other (TV) channels. In one illustrative embodiment, the guest communication channel occupies the spectral range up to 50 MHz, and utilizes binary phase shift keying in the uplink direction, and raised-cosine frequency shift keying in the downlink direction. The TV frequency bands then start at 55 MHz to avoid interference. Also, in the preferred embodiment, the mode of communication is a polling mode wherein processor 210 is the master and operates to poll each guest appliance 120, 121, . . . to determine if there is a guest request waiting. The polling may be a combination of round-robin and selective to further ensure there are no request conflicts.

System Software

Figure 4:
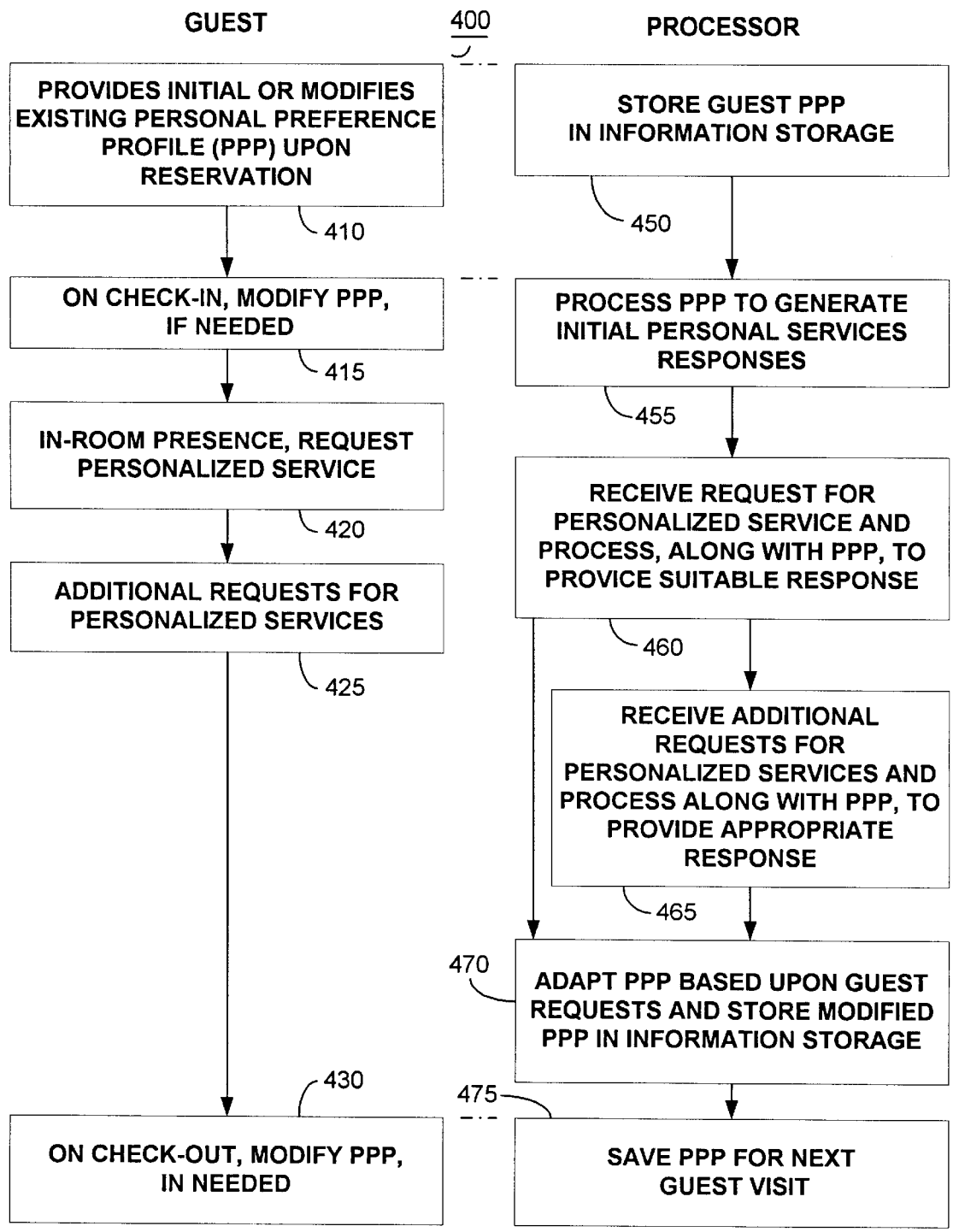
FIG. 4 depicts a high-level flow diagram depicting the input by the guest and the corresponding processing effected by the processor of FIG. 2.

With reference to FIG. 4, there is shown high-level flow diagram 400 depicting the input obtained from or provided by a guest, and the corresponding processing effected by processor 210 of FIG. 2. On the left-hand side of FIG. 4, under the column labeled GUEST, the guest activities are depicted; correspondingly, the right-hand side, under the column labeled PROCESSOR, depicts the processing by processor 210.

In particular, activity block 410 shows that the guest provides information for an initial personal preference profile (PPP) or modifies an existing (PPP) upon a reservation for a next stay in the hotel. The latest PPP information is captured and then stored in information storage device 220 of FIG. 2, as depicted by processing block 450.

Next, upon check-in, the PPP information may be modified by front desk personnel based upon additional or changed guest inputs, as shown by activities block 415. At this time, the PPP may be processed to generate personal services responses, as shown by processing block 455. For example, assume the guests home phone number and his preference in music are listed in the PPP—then the telephone in the guest's room may be programmed for speed dialing to his home phone, and the stereo in the guest's room may be tuned to the guest's favorite music.

Once the guest has arrived in his room, assume that he uses the remote control associated with the guest appliance to invoke a personalized request, as shown by activities block 420. Correspondingly, processing block 460 is invoked to receive the request for personalized service and, along with the information stored in the PPP, to provide a suitable response. For instance, suppose the guest desires to see the menu of the hotel's restaurant—the menu may be presented to him on his in-room TV with his selections from his last stay shown highlighted, or the menu may be especially arranged for this guest based on his dietary preferences. If it is further assumed that the guest makes a selection for dinner that night, then the PPP information is updated based upon that selection; this processing is shown by block 470.

Additional in-room activities which occur during the guests stay are shown by activities block 425, and such activities are processed by processing blocks 465 and 470 in a manner similar to the processing by blocks 460 and 470 elucidated above. As another example, it is supposed that the guest viewed a baseball game on a particular channel the previous night; this information is collected and used to update the PPP information so that if the guest turns on his TV the next night, and a baseball game is being shown on the same channel, the TV is automatically switched to that channel.

Finally, upon check-out, as shown by activities block 430, the PPP information is again modified as needed. Processing by block 475 saves the latest PPP information for retrieval during the next guest visit or upon the next reservation.

Expanded Capabilities of System 100

Figure 5:
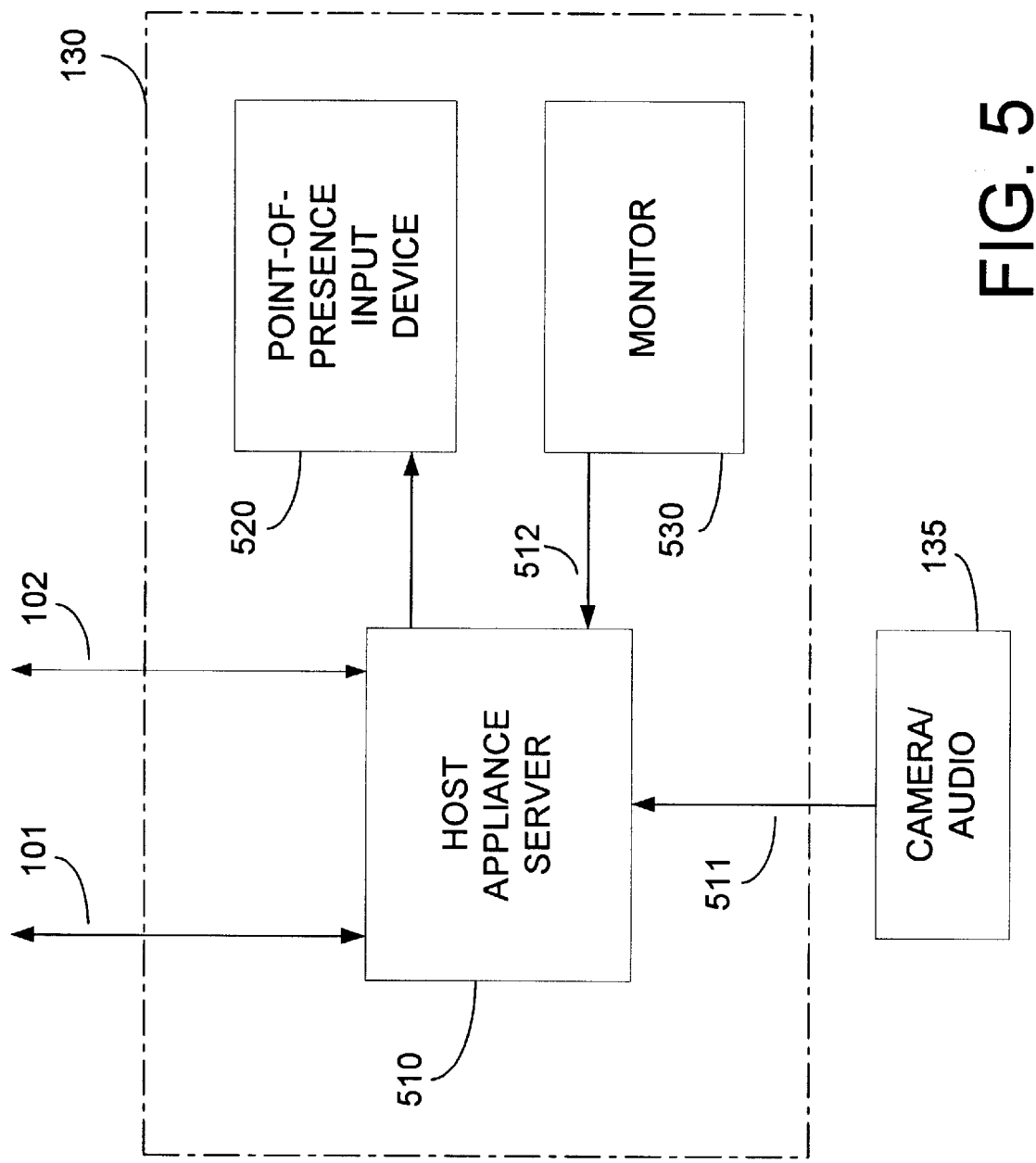
FIG. 5 depicts a high-level block diagram of the hotel appliance of FIG. 1 wherein host personnel may insert content to service a guest request.

With reference to FIG. 5, there is shown a more detailed view of host appliance 130 which is configured at a point-of-presence to allow host personnel to: (i) request processing by processor 210 of FIG. 2; and (ii) call into view a display which will allow the host personnel interacting with the guest the ability to provide enhanced service. In FIG. 5, host appliance 130 is further composed of host appliance server 510, point-of-presence input device 520 (e.g. a keypad), and monitor 530. In operation, suppose the maitre'd desires to show a guest who has called the menu for dinner. Also assume that the maitre'd desires to use the guest's personal preference profile to view the guest's dietary preferences while conversing with the guest. The maitre'd can call into view the guest's personal presence profile using input device 520 to make the request, and the profile will be displayed on monitor 530 in the same manner the guest would see such a display if the guest made a corresponding inquiry. Now, the visual and audio pick-up, that is, the live-pick up of the host personnel, obtained from device 135 propagates over link 511 in the uplink direction onto link 102 (from host appliance 130 to controller 110) on an uplink channel marked by processor 210. The downlink direction of link 102, again as marked by processor 210, carries the menu screen on another channel to host server 510 and, in turn, to monitor 530 via link 512.

Figure 6:
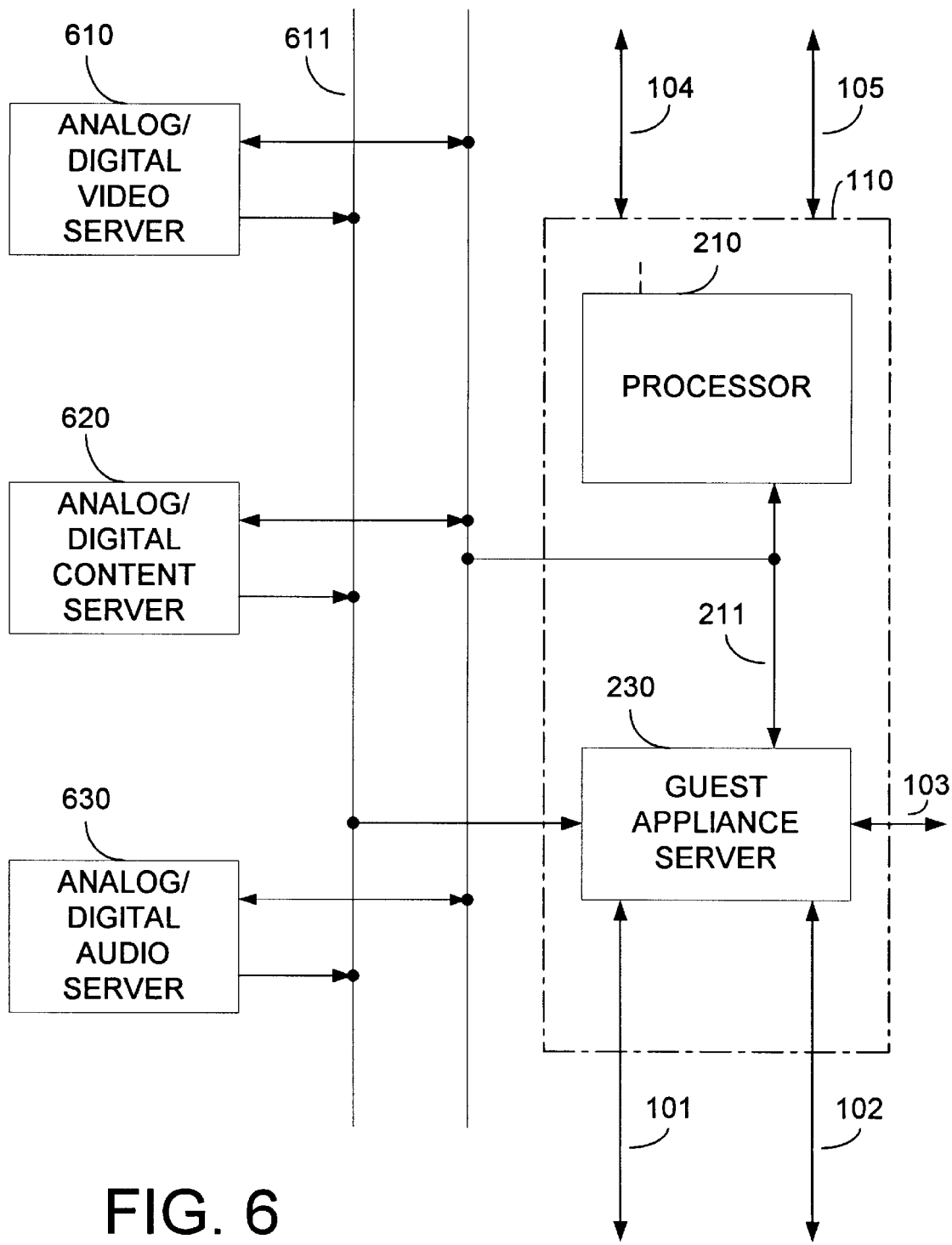
FIG. 6 depicts, in partial overlay fashion on FIG. 2, servers for providing analog or digital video, content, and audio.

With reference to FIG. 6, there is shown circuitry added to the circuitry of FIG. 2 for providing analog or digital video, content, or audio to guests. In particular, analog/digital server 610 connects to guest appliance server 230 via new link 611 and existing bus 211; link 611 is a medium that supports a plurality of TV-grade channels. As an example of the application of server 610, suppose a guest selects a movie using his in-room guest appliance and remote control. The guest request is delivered to processor 210 via guest appliance server 230 over bus 211 and, after suitable processing, to video server 610 via bus 211. If the movie is on video tape, video server 610 includes a conventional analog video tape play-back unit (not shown). If the movie is stored in digital format, then server 610 is composed of a standard digital-to-analog play-back converter (not shown). Processor 210 marks a particular channel on both link 103 and link 611 for propagation of the composite TV signal, and guest appliance server 230 couples the marked channels on links 611 and 103 so as to deliver the TV signal to the guest's TV.

In a similar fashion, analog/digital content server 620 connects to guest appliance server 230 via new link 611 and existing bus 211. As an example of the application of server 620, suppose server 620 stores maps of the area in digital format, and a guest desires to have a local map displayed on his in-room TV. The guest request is delivered to processor 210 via guest appliance server 230 over bus 211 and, after suitable processing, to content server 620 via bus 211. A conventional digital-to-analog converter (not shown) extracts the digital version of the stored map and converts it to a format for display on the guest's TV. Again, processor 210 marks a particular channel on both link 103 and link 611 for propagation of the composite TV signal representative of the map, and guest appliance server 230 couples the marked channels on links 611 and 103 so as to deliver the TV signal to the guest's TV.

In a similar manner, analog/digital audio server 630 connects to guest appliance server 230 via new link 611 and existing bus 211. As an example of the application of server 630, suppose server 630 stores music in digital format, and a guest desires to hear a particular musical selection in audio on his TV (or, if available, an in-room stereo). The guest request is delivered to processor 210 via guest appliance server 230 over bus 211 and, after appropriate processing, to audio server 630 via bus 211. A conventional digital-to-analog converter (not shown) extracts the digital music and converts it to a format for transmission to the guest's TV. Again, processor 210 marks a particular channel on both link 103 and link 611 for propagation of, for example, a composite TV signal having audio components representative of the music and blank video, and guest appliance server 230 couples the marked channels on links 611 and 103 so as to deliver the composite signal to the guest's TV.

Figure 7:
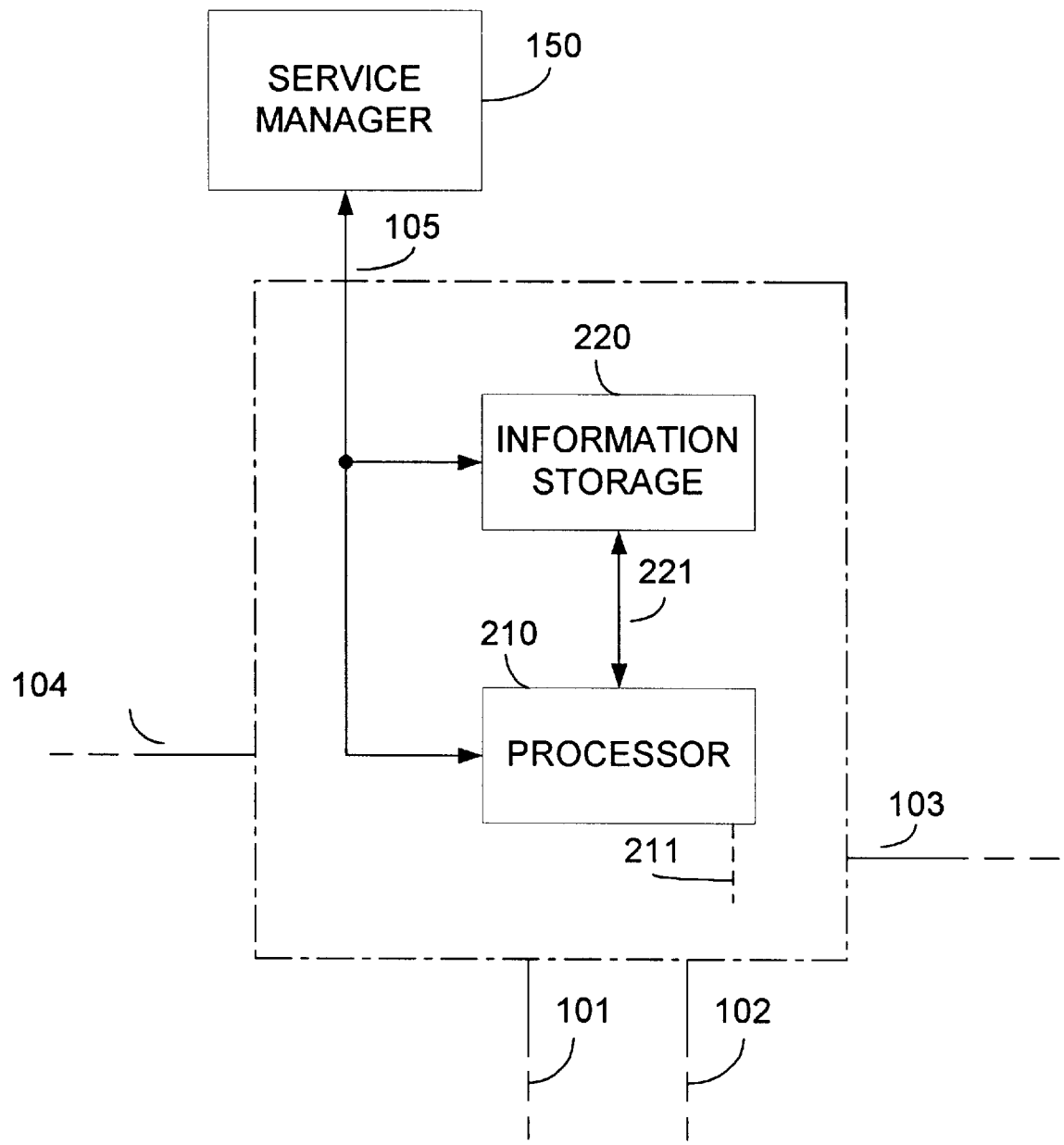
FIG. 7 depicts, in partial overlay fashion on FIG. 2, the interaction of the service manager with the controller of FIG. 1.

With reference to FIG. 7, there is shown circuitry added to the circuitry of FIG. 2 for configuring processor 210 as well as managing programs stored in processor 210, all under control of service manager 150, which is generally at a remote administrative location. The management of programs includes the changing, updating, or deleting of existing programs stored in processor 210. Thus, as discussed above, besides being able to load personal preference profile information into information storage device 220, service manager 150 also has direct access to processor 210 via bi-directional link 105 to perform desired system configuration and modification operations. Such a capability is especially useful so that system upgrades can be effected remotely. Moreover, using the setup of FIG. 7, service manager 150 may also request and store personal preference profile information that has been modified as a result of a guest's stay. In this way, another hotel in, for example, another city that the guest frequents may have the latest profile information.

Although various embodiments which incorporate the teachings of the present invention have been shown and described in detail herein, those skilled in the art can readily devise many other varied embodiments that still incorporate these teachings.

I claim:

1. A method for providing guests of a facility a personalized service using a room-based device responsive to inputs from and providing outputs to each particular guest, each device serving a corresponding one of the guests being connected to a central controller, the method comprising the steps of adapting personal preference information stored in the controller based upon the inputs initiated by a particular guest including inputs transmitted from the corresponding device to the controller, wherein the personal preference information may be obtained from the particular guest and stored prior to the arrival of the particular guest as well as being generated and stored during the present stay by the particular guest, the personal preference information being indicative of demographic information, dietary information, and entertainment information including the preference of the particular guest for TV programming and musical selections, generating a personalized response in the controller based upon to the personal preference information, and communicating the personalized response from the controller to the corresponding device of the particular guest to provide the particular guest with a personalized output from the corresponding device.

2. The method as recited in claim 1 further including a signal server located remotely from the guest rooms to provide server information, the server being connected to the controller, and wherein the step of generating includes the step of producing the personalized response based upon both the personalized preference information and the server information.

3. The method as recited in claim 2 wherein the room-based device includes a TV, wherein the signal server is a digital video server, the server information is a TV signal derived from the digital video server, and the step of communicating the personalized response includes the step of transmitting the TV signal for detection by the TV.

4. The method as recited in claim 2 wherein the room-based device includes a TV, wherein the signal server is an analog video server, the server information is a TV signal derived from the analog video server, and the step of communicating the personalized response includes the step of transmitting the TV signal for detection by the TV.

5. The method as recited in claim 1 further including a service manager device located remotely from facility to collect personal preference information, the service manager device being connected to the controller via a communication link, and the method further including, prior to the step of adapting, the step of downloading the personal preference information from the service manager device to the controller over the communication link.

6. The method as recited in claim 1 further including a service manager device located remotely from facility to store programs executable by the controller, the service manager device being connected to the controller via a communication link, and the method further including, prior to the step of adapting, the step of downloading programs from the service manager device to the controller over the communication link.

7. The method as recited in claim 1 further including a single medium linking each room-based device to the controller, and further including the step of transmitting inputs from each guest over the single medium.

8. The method as recited in claim 7 wherein the medium is partitioned into channels and the step of communicating includes the step of transmitting the personalized responses for each guest over a selected one of the channels.

9. A method for providing guests of a facility a personalized service using a room-based device responsive to inputs from and providing outputs to each particular guest, each device serving a corresponding one of the guests being connected to a central controller, and further including a service device located remotely from the guest rooms to collect service information from a service person located at the point-of-presence of the service device, the service device being connected to the controller, the method comprising the steps of adapting personal preference information stored in the controller based upon the inputs initiated by a particular guest and transmitted from the corresponding device to the controller, generating a personalized response in the controller based upon to the personal preference information, and communicating the personalized response from the controller to the corresponding device of the particular guest to provide the particular guest with a personalized output from the corresponding device, wherein the step of generating includes the step of producing the personalized response based upon both the personalized preference information and the service information.

10. The method as recited in claim 9 wherein the in-room device includes a TV, wherein the service device is a TV camera with video and audio pick-up, and the service information is a TV signal derived from visual and audio pick-up of the service person, and the step of communicating the personalized response includes the step of transmitting the TV signal for detection by the TV.

11. A method for providing guests of a facility a personalized service using a room-based device responsive to inputs from and providing outputs to each particular guest, each device serving a corresponding one of the guests being connected to a central controller, and further including: a service device located remotely from the guest rooms to collect service information from a service person located at the point-of-presence of the service device, the service device being connected to the controller; and a signal server located remotely from the guest rooms to provide server information, the server being connected to the controller, the method comprising the steps of adapting personal preference information stored in the controller based upon the inputs initiated by a particular guest and transmitted from the corresponding device to the controller, generating a personalized response in the controller based upon to the personal preference information, and communicating the personalized response from the controller to the corresponding device of the particular guest to provide the particular guest with a personalized output from the corresponding device, wherein the step of generating includes the step of producing the personalized response based upon the personalized preference information, the service information, and the server information.

12. A method for providing guests of a facility a personalized service using a room-based device responsive to inputs from and providing outputs to each particular guest, each device serving a corresponding one of the guests being connected to a central controller, the method comprising the steps of collecting personal preference information for each particular guest, wherein the personal preference information may be obtained from the particular guest and stored prior to the arrival of the particular guest as well as being generated and stored during the present stay by the particular guest, the personal preference information being indicative of demographic information, dietary information, and entertainment information including the preference of the particular guest for TV programming and musical selections, adapting personal preference information stored in the controller based upon the inputs initiated by a particular guest including inputs transmitted from the corresponding device to the controller, generating a personalized response in the controller based upon to the personal preference information, and communicating the personalized response from the controller to the corresponding device of the particular guest to provide the particular guest with a personalized output from the corresponding device.

13. The method as recited in claim 12 further including a signal server located remotely from the guest rooms to provide server information, the server being connected to the controller, and wherein the step of generating includes the step of producing the personalized response based upon both the personalized preference information and the server information.

14. The method as recited in claim 12 further including: a service device located remotely from the guest rooms to collect service information from a service person located at the point-of-presence of the service device, the service device being connected to the controller; and a signal server located remotely from the guest rooms to provide server information, the server being connected to the controller, and wherein the step of generating includes the step of producing the personalized response based upon the personalized preference information, the service information, and the server information.

15. The method as recited in claim 12 further including a service manager device located remotely from facility to store programs executable by the controller, the service manager device being connected to the controller via a communication link, and the method further including, prior to the step of adapting, the step of downloading programs from the service manager device to the controller over the communication link.

16. The method as recited in claim 12 further including a single medium linking each room-based device to the controller, and further including the step of transmitting inputs from each guest over the single medium.

17. The method as recited in claim 16 wherein the medium is partitioned into channels and the step of communicating includes the step of transmitting the personalized responses for each guest over a selected one of the channels.

18. A method for providing guests of a facility a personalized service using a room-based device responsive to inputs from and providing outputs to each particular guest, each device serving a corresponding one of the guests being connected to a central controller, further including a service device located remotely from the guest rooms to collect service information from a service person located at the point-of-presence of the service device, the service device being connected to the controller, the method comprising the steps of collecting personal preference information for each particular guest, adapting personal preference information stored in the controller based upon the inputs initiated by a particular guest and transmitted from the corresponding device to the controller, generating a personalized response in the controller based upon to the personal preference information, and communicating the personalized response from the controller to the corresponding device of the particular guest to provide the particular guest with a personalized output from the corresponding device, wherein the step of generating includes the step of producing the personalized response based upon both the personalized preference information and the service information.

19. A method for providing guests a personalized service using a room-based device responsive to inputs from and providing outputs to each particular guest, each device being connected to a central controller, the method comprising the steps of collecting personal preference information for each particular guest, wherein the personal preference information may be obtained from the particular guest and stored prior to the arrival of the particular guest as well as being generated and stored during the present stay by the particular guest, the personal preference information being indicative of demographic information, dietary information, and entertainment information including the preference of the particular guest for TV programming and musical selections, storing the personal preference information in the controller, sending a service request message initiated by the particular guest from the device to the controller, adapting the personal preference information based upon the service request message, generating in the controller a personalized response message corresponding to the service request message with reference to the personal preference information, communicating the personalized response message from the controller to the device of the particular guest, and storing the personal preference information in the controller after the departure of the particular guest.

20. A system for providing guests of a facility a personalized service using a room-based device responsive to inputs from and providing outputs to each particular guest, each device serving a corresponding one of the guests being connected to a central controller, the system comprising adaptation means for adapting personal preference information stored in the controller based upon the inputs initiated by a particular guest and transmitted from the corresponding device to the controller, wherein the personal preference information may be obtained from the particular guest and stored prior to the arrival of the particular guest as well as being generated and stored during the present stay by the particular guest, the personal preference information being indicative of demographic information, dietary information, and entertainment information including the preference of the particular guest for TV programming and musical selections, generator means for generating a personalized response in the controller based upon to the personal preference information, and communication means for communicating the personalized response from the controller to the corresponding device of the particular guest to provide the particular guest with a personalized output from the corresponding device.

* * * * *